Patented Oct. 31, 1933

1,932,518

UNITED STATES PATENT OFFICE 1,932,518

METHOD OF MAKING PRIMARY AMINO COMPOUNDS

William J. Hale, Midland, Mich., assignor to The Dow Chemical Company, Midland, Mich., a corporation of Michigan No Drawing. Application August 31, 1928
Serial No. 303,361

8 Claims. (Cl. 260—130.5)

The well-known type of organic compounds, known as the "ammonia" type, may theoretically be regarded as derived from the "water type" by the replacement of oxygen therein by its equivalent, the imino group, NH. A singly substituted alkyl or aryl derivative of ammonia is known as a primary amine and is commonly produced through an ammonolysis of the corresponding alkyl or aryl derivative of an inorganic acid. A doubly substituted alkyl or aryl derivative of ammonia is the counterpart of an ether, and as the imino group now occupies the oxygen position of an ether we may regard such type of compound as an imino-ether. Just as with the ethers of the water type, the ethers of the ammonia type, strictly speaking, are to be regarded as having a constitution wherein two hydrogen atoms of ammonia are severally replaced by univalent organic radicles.

In the state of equilibrium arising when a primary substituted amine is under production at higher temperatures, such imino-ethers may be regarded as resulting directly through a loss of ammonia (de-ammonation) from the primary amine here shown by the following equations, in which R represents either an alkyl or aryl group, and X represents an inorganic acid radicle, viz:—

(1) $RX + NH_3 \rightleftharpoons NH_2R + HX$
(2) $2NH_2R \rightleftharpoons NHR_2 + NH_3$ However, the ammonia type differs from the water type in that the former presents a third position for substitution to give what is known as tertiary amine. Considering one of these positions of ammonia as already substituted the reactions for ammonolysis of an inorganic acid derivative may be represented as follows:

(3) $RX + NH_2R \rightleftharpoons NHR_2 + HX$
(4) $2NHR_2 \rightleftharpoons NR_3 + NH_2R$ The tertiary amine is here shown to result through a de-ammonation of the secondary substituted compound, and, together with the primary amine, is in equilibrium with the imino-ether or secondary amine.

The interaction of aliphatic organic derivatives of inorganic acids with ammonia takes place with much greater ease than where aromatic derivatives are concerned. For example, as reported in the literature, Bl. Soc. Chim. (2) 45,499 (1886), methyl chloride reacts with ammonia at ordinary temperatures when under a pressure of 25 atmospheres. In all cases when interaction is once established there arises two states of equilibrium: one between the primary amine as against the secondary amine and ammonia; and the other between the secondary amine as against the tertiary amine and primary amine. These two conditions are illustrated above in the two equations (2) and (4), respectively. There is furthermore a mutual interdependence between these two states of equilibrium. This is established by the definite concentration of the secondary amine component common to the two equations and thus the concentration of tertiary amine becomes directly proportional to that of primary amine.

The present invention is based on the discovery that by reason of this interlocking of the two states of equilibrium, the one covering the formation of secondary amine and the other the formation of the tertiary amine, it is possible to direct the ammonolysis of an organic derivative of an inorganic acid substantially entirely into the primary amine.

To the accomplishment of this and related ends the invention, then, consists of the steps hereinafter described and particularly pointed out in the claims, the following description setting forth but several of the various ways in which the invention may be carried out.

In the preparation of a primary amine as set forth in the two states of equilibrium referred to above, it becomes necessary only to introduce into the original reaction mixture that same proportional quantity both of secondary amine and tertiary amine found to be produced under the conditions of operation. As a result of supplying these two components to the system undergoing ammonolysis, and in such proportions as to maintain throughout the entire reaction zone their respective concentrations at the maxima set by the particular state of equilibrium concerned, it is found that the organic derivative of an inorganic acid tends to be solely ammonolyzed into primary amine. Naturally the use of any one of these polysubstituted amines in sufficiently large excess can be made to bring into the system the requisite quantity of the other amine, but such procedure, by maintenance of an unnecessary excess of one of these polysubstituted amines, will restrict the total operating efficiency by reduction of the same proportional amount of original organic ingredient entering into ammonolysis.

Though anhydrous ammonia serves admirably for many of these reactions of ammonolysis upon organic derivatives of inorganic acids, it is highly desirable, or at least practical from the operating view point, to conduct such reactions or certain of them in alcoholic, or preferably aqueous media and primarily by reason of the lower temperatures here found effective. In aqueous media a very high concentration of ammonia must be maintained in order to drive to a minimum the concomitant effect of hydrolysis through action of water and especially through influence of hydroxide ion brought into play by presence of ammonium hydroxide as such. At the high temperatures usually required for ammonolysis of aryl derivatives appreciable quantities of corresponding aryl hydroxide will be produced and consequently such amount of diaryl oxide as is in equilibrium with such hydroxide at these temperatures.

The present improved procedure according contemplates that in any such reaction comprising the ammonolysis of an organic derivative of an inorganic acid in an aqueous medium, the accompanying production of an organic oxide by the dehydration of its hydroxide may likewise be brought under control by returning or adding to the reaction mixture sufficient of such oxide to establish a state of equilibrium, similar to that prescribed above for the secondary and tertiary amines. In other words, the application of this principle as concerns hydrolysis conjointly with its application in analogous manner to ammonolysis offers a successful means of operating in an aqueous medium for the ammonolysis of an organic derivative of an inorganic acid with conversion thereof substantially entirely into the primary amino derivative of the organic radicle concerned, together with whatever hydroxyl derivative of the same is made possible of production through the presence of water in the reaction mixture.

In the practice of this invention, it becomes necessary to determine in the equilibria present the proportional quantity of organic oxide, or ether, in the final reaction product, as well as the proportional quantities of secondary and tertiary amines likewise found in the reaction product; whereupon the introduction of these several proportional quantities conjointly into the original reaction mixture will force this mixture, upon entering the system, to carry at maximum concentration not only the secondary and tertiary amino derivatives, but also the oxide, or ether, as well, and thereby to function in further repression of the formation of these poly-substituted compounds.

When a non-ammonolyzable substituent of an organic radicle attached to an inorganic acid group is concerned, the final amino product, as may be expected, will carry this same substituent group. Thus a chlorotoluene upon ammonolysis may be made to yield solely a toluidine, when there is reintroduced into the reaction system the same proportional quantity of di-tolyl- and tri-tolyl-amines as are found to occur in the reaction.

The higher analogues of the ammonia type of organic compounds, as phosphine, arsine, stibine and the like, offer only few instances wherein primary alkyl or aryl derivatives are possible of preparation according to the present invention; the higher temperatures lead almost immediately to complete decomposition of the hydrides involved.

In further illustration of the procedure for carrying out this invention, certain distinguishing features may best be described by the following examples:—

*Example I.*—In the preparation of n-butyl amine, by the present improved process, there is introduced into a closed vessel provided with means for keeping the contents of same in motion or gentle mixing, a mixture of a normal butyl derivative of an inorganic acid, such as n-butyl chloride, and concentrated aqueous solution of ammonia containing a quantity of anhydrous ammonia equivalent to 3 to 5 times the molecular quantity of butyl chloride present. The vessel will be desirably maintained at a temperature of approximately 150° to 200° C., under which conditions a pressure of several hundred pounds will be developed. Into the same reaction vessel, and together with the ingredients aforementioned, there will likewise be admitted a mixture of dibutyl amine, tributyl amine and dibutyl ether, the relative proportions of these several components in said mixture being determined by the beforementioned readily ascertainable equilibrium conditions that correspond with the conditions of temperature and pressure selected for the particular operation.

Thus, in the ammonolysis of one mole of normal butyl chloride (92.5 gm.) with as low as 3 moles of ammonia (51 gm.) in 28 per cent aqueous solution complete reaction is effected in 3 hours at 175° C. In the reaction product is found n-butyl-amine (29.2 gm.) in 40 per cent yield, based upon the butyl chloride used, and a small quantity of butyl alcohol, together with the secondary and tertiary components in the following amounts; dibutyl amine (16.5 gm.) in 26.7 per cent yield, tributyl amine (15 gm.) in 24.2 per cent yield and dibutyl ether (1.5 gm.) in 3.8 per cent yield. Accordingly in the practice of this invention these components, in aproximately these same proportions, are added along with the n-butyl chloride entering upon ammonolysis. In the operation as so conducted, the further production of dibutyl amine and tributyl amine beyond the concentrations here introduced is prevented, or at least is restrained to a substantial degree; likewise the further production of dibutyl ether from the butyl alcohol, produced through concomitant hydrolytic action of water upon butyl chloride, is similarly restrained. As regards the formation of butyl alcohol there is evidence that it reacts with ammonia to some extent when the latter is in great excess, under the conditions as above described and particularly when certain catalysts are present, to give butyl amine.

Upon completion of the operation, the reaction mixture is discharged into a closed vessel and, after distilling off the unreacted excess of ammonia, is cooled and neutralized with acid. The dibutyl ether is extracted with a suitable immiscible solvent and returned to a succeeding operation. The aqueous solution, containing the salts of the amines, is then made slightly alkaline and the amines removed by distilling; whereupon fractionation of the distillate yields a residual portion which contains the secondary and tertiary amines, and these likewise are returned along with the dibutyl ether to the next charge of butyl chloride and ammonia entering into reaction. The final aqueous residue may be worked up for the recovery of butyl alcohol.

When the ammonolysis of butyl chloride is conducted in anhydrous media there is of course no formation of butyl alcohol and corresponding dibutyl ether, but such procedure is not regarded as commercially expedient owing to loss of solvent.

*Example II.*—The ammonolysis of aryl derivatives of inorganic acids requires somewhat higher temperatures and pressures and longer time of reaction. Thus when chlorobenzene is made to react with a concentrated aqueous solution of ammonia, at least five moles of ammonia per mole of chlorobenzene will preferably be used to make up the charge entering the reaction vessel. When this mixture is heated with agitation at 200° to 240° C. for six to eight hours in the presence of a suitable catalyst such as a cuprous compound, e. g., cuprous oxide, the chlorobenzene will be found completely converted, and in addition to aniline, there will be present about 1 to 2 per cent. diphenylamine and 0.1 to 0.5 per cent. triphenylamine. Through the presence of water, and simultaneous hydrolytic action set up to small extent, there will be found also about 5 per cent. of phenol and about 0.5 per cent. of diphenyl oxide, based upon the chlorobenzene entering the system.

In carrying out the foregoing process in accordance with the present improved procedure, the reaction vessel, in addition to the stated ingredients, will also be charged with approximately such proportional quantities of diphenyl amine, triphenylamine and diphenyl oxide as just stated. The long period of heating makes necessary the introduction of diphenyl oxide which otherwise would not be expected to reach equilibrium under the conditions here chosen. The result will be the direction of the ammonolysis of chlorobenzene entirely to the production of aniline and about 5 per cent. of phenol. The oily layer of the reaction mass after cooling will be separated from free ammonia, then made alkaline and the amines distilled off together with the diphenyl oxide. Fractionation of the distillate will separate the aniline from the residual mass containing diphenylamine, triphenylamine and diphenyl oxide which is to be reintroduced into the system. The aqueous alkaline residue from the distillation is acidified and the phenol distilled out with steam. The aqueous layer of the original reaction mixture will be worked up for the recovery of ammonia and catalyst.

*Example III.*—When ammonolysis of organic derivatives of inorganic acids is to be conducted in the vapor phase, either at atmospheric or other pressures, in general, higher temperatures than those given in the preceding examples will be required, and also the use of a catalyst, as for example cuprous oxide or chloride, will be desirable. The relative concentrations of the polysubstituted amines capable of production under the conditions of operation will first be determined, whereupon these same proportional quantities are introduced into the reaction zone at any point prior to the end stage, and thus the equilibrium established as heretofore described.

By way of general explanation of the procedure illustrated in the foregoing description and examples, it may be stated that when, in any given organic chemical reaction, one of the primary products, through a subsidiary reaction, such as by dehydration, enters into a condition of equilibrium with a secondary organic compound formed thereby, and an accompanying inorganic component, such as water, or the like, such condition of equilibrium may be initially and artificially established by adding such amount of the secondary organic compound as is capable of formation under the conditions in force.

Thereby the system is maintained in a state of balance as between the primary product sought and the secondary organic compound together with an accompanying inorganic component, such that no further consequential production of the secondary compound will occur at the expense of the primary product. Naturally the higher the concentration of the inorganic component occurring conjointly with the secondary organic compound, the lower will be the concentration of such organic compound, and thus the smaller will be the quantity thereof that need be added to the system for the carrying out of this invention.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. In a process for the manufacture of a primary amine of the lower aliphatic or benzene series, the steps which consist in reacting ammonia with a monohalogenated hydrocarbon of the class consisting of the lower aliphatic and benzene series and adding the corresponding secondary and tertiary amines to the reacting ingredients.

2. In a process for the manufacture of a primary amine of the lower aliphatic or benzene series, the steps which consist in reacting ammonia with a monohalogenated hydrocarbon of the class consisting of the lower aliphatic and benzene series, separating the primary amine product from the accompanying secondary and tertiary amines, and returning the latter to the initial reaction.

3. In a process for the manufacture of a primary amine of the lower aliphatic or benzene series, the steps which consist in reacting aqueous ammonia solution with a mono-halogenated hydrocarbon of the class consisting of the lower aliphatic and benzene series and adding the corresponding secondary and tertiary amines and organic oxide to the reacting ingredients.

4. In a process for the manufacture of a primary amine of the lower aliphatic or benzene series, the steps which consist in reacting aqueous ammonia solution with a mono-halogenated hydrocarbon of the class consisting of the lower aliphatic and benzene series, separating the primary amine product from the accompanying secondary and tertiary amines and organic oxide, and returning the latter to the initial reaction.

5. In a process for the manufacture of aniline, the steps which consist in reacting aqueous ammonia solution with chlorobenzene in the presence of a cuprous compound as catalyst and adding diphenylamine, triphenylamine and diphenyloxide to the reacting ingredients.

6. In a process for the manufacture of aniline, the steps which consist in reacting aqueous ammonia solution with chlorobenzene in the presence of a cuprous compound as catalyst, separating the aniline product from the accompanying secondary products, viz., diphenylamine, triphenylamine and diphenyloxide, and returning such secondary products to the initial reaction.

7. In a process for making a primary arylamine of the benzene series, the steps which consist in reacting aqueous ammonia solution with a monohalogenated aromatic hydrocarbon of the benzene series in the presence of a cuprous compound as catalyst and the corresponding secondary and tertiary arylamines.

8. In a process for making a primary arylamine of the benzene series, the steps which consist in reacting aqueous ammonia solution with a mono-halogenated aromatic hydrocarbon of the benzene series in the presence of a cuprous compound as catalyst and the corresponding secondary and tertiary arylamines, separating the primary arylamine product from the accompanying secondary and tertiary amines, and returning the latter to the initial reaction.

WILLIAM J. HALE.